United States Patent
Baker et al.

(10) Patent No.: US 9,380,110 B2
(45) Date of Patent: Jun. 28, 2016

(54) ADAPTIVE DATA SYNCHRONIZATION BASED ON DATA PLAN OR NETWORK USAGE

(75) Inventors: Paul Baker, Eastleigh (GB); Alexander J. Ralph, Bradford-on-Avon (GB)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 790 days.

(21) Appl. No.: 13/316,017

(22) Filed: Dec. 9, 2011

(65) Prior Publication Data

US 2013/0151658 A1  Jun. 13, 2013

(51) Int. Cl.
*G06F 15/16* (2006.01)
*H04L 29/08* (2006.01)

(52) U.S. Cl.
CPC ............ *H04L 67/1095* (2013.01); *H04L 67/26* (2013.01)

(58) Field of Classification Search
CPC ...................................................... H04L 67/26
USPC ................................................. 709/217, 232
See application file for complete search history.

(56) References Cited

U.S. PATENT DOCUMENTS

| 7,783,787 | B1 | 8/2010 | DeBergalis et al. |
| 7,809,384 | B2 * | 10/2010 | Vargas et al. ................. 455/502 |
| 7,941,167 | B2 | 5/2011 | Xu et al. |
| 7,991,879 | B2 | 8/2011 | Josefsberg et al. |
| 8,040,992 | B2 | 10/2011 | Demoulin et al. |
| 2007/0189514 | A1 | 8/2007 | Mehta et al. |
| 2008/0037593 | A1 | 2/2008 | Friedman et al. |
| 2008/0049714 | A1 | 2/2008 | Commarford et al. |
| 2009/0327491 | A1 | 12/2009 | Tran et al. |
| 2010/0077083 | A1 | 3/2010 | Tran et al. |
| 2010/0269164 | A1 | 10/2010 | Sosnosky et al. |
| 2010/0274507 | A1 | 10/2010 | Black et al. |

(Continued)

FOREIGN PATENT DOCUMENTS

| CA | WO2010128391 | A2 * | 11/2010 | ............ H04W 28/02 |
| EP | 2190174 | A1 | 5/2010 | |

(Continued)

OTHER PUBLICATIONS

Patent Cooperation Treaty, International Search Report and Written Opinion of the International Searching Authority for International Application No. PCT/US2012/066056, Apr. 5, 2013, 13 pages.

*Primary Examiner* — Glenford Madamba
(74) *Attorney, Agent, or Firm* — Morris & Kamlay LLP (57) ABSTRACT

A method and apparatus for modifying data synchronization of a portable computing device responsive to a data plan associated with an account associated with the portable computing device are disclosed. If the data plan specifies a data quota identifying a maximum amount of data for communication by the portable computing device, a data synchronization setting determines whether to minimize the frequency of synchronization between the portable computing device and a server or to dynamically modify the frequency of synchronization based on data usage. If data synchronization is dynamically modified, the data synchronization frequency is modified based on an estimated data usage of the portable computing device over a time interval. The data synchronization frequency is modified based on the difference between estimated data usage and the data quota and is reduced if the estimated data usage equals or exceeds the data quota.

26 Claims, 4 Drawing Sheets

(56) References Cited

U.S. PATENT DOCUMENTS

2010/0287256 A1 11/2010 Neilio
2011/0029670 A1* 2/2011 Klein et al. .................. 709/225
2011/0294502 A1* 12/2011 Oerton ....................... 455/426.1

FOREIGN PATENT DOCUMENTS

| WO | 03084136 A1 | 3/2003 |
| WO | 03094029 A1 | 11/2003 |
| WO | 2010128391 A2 | 11/2010 |

* cited by examiner

Figure 4

ADAPTIVE DATA SYNCHRONIZATION BASED ON DATA PLAN OR NETWORK USAGE

FIELD OF THE DISCLOSURE

The present disclosure relates generally to portable computing devices and more particularly to modifying data synchronization of a portable computing device.

BACKGROUND

Portable computing devices, such as smartphones or tablet computers, have become increasingly powerful and user-friendly. Increased network connectivity has further enhanced portable computing device functionality, allowing portable computing devices to provide a wider range of functionalities and/or data. For example, portable computing devices are commonly used to retrieve, or otherwise interact with, data stored or maintained by a server, allowing a user to more frequently view, modify or otherwise interact with data on the server.

To readily provide access to data maintained by a server, a portable computing device frequently exchanges data with the server to synchronize data stored on the portable computing device and data stored on the server. Different data synchronization settings may be used by the portable computing device to exchange data with a server. For example, the portable computing device may poll the server at a regular polling interval to transmit data to the server or retrieve data from the server. Alternatively, data may be pushed from the portable computing device to a server, or from a server to the portable computing device, at a periodic interval.

However, each exchange of data between a portable computing device and a server consumes battery resources and processing resources, reducing portable computing device performance. Additionally, a data plan provided by a network provider often limits the amount of data exchanged between the portable computing device and one or more servers. Typically, a data plan specifies data quota identifying an amount that may be exchanged between a portable computing device and one or more servers over a specified interval. Often, an amount of data exceeding the data quota may be exchanged between the portable computing device and a server if a portable computing device user pays an additional fee to the network provider based on the amount of excess data exchanged. For example, a data plan allows a portable computing device to transmit and receive 10 megabytes of data per month between a portable computing device and one or more servers. However, exchanging data between the portable computing device and one or more servers may consume all, or a significant amount, of the portable computing device user's data quota. This may result in the portable computing device user incurring additional charges for exceed the user's data quota.

BRIEF DESCRIPTION OF THE DRAWINGS

The accompanying Figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the Figures are illustrated for simplicity and clarity and have not necessarily been drawn to scale. For example, the dimensions of some of the elements in the Figures may be exaggerated relative to other elements to help to improve understanding of embodiments of the present invention.

The apparatus and method components have been represented where appropriate by conventional symbols in the drawings, showing the specific details that are pertinent to understanding the embodiments of the present invention so as not to obscure the disclosure with details that will be readily apparent to those of ordinary skill in the art having the benefit of the description herein.

DETAILED DESCRIPTION

The following disclosure describes a method and apparatus for modifying data synchronization between a portable computing device and a server responsive to a data plan associated with an account associated with the portable computing device. A processor included in the portable computing device executes instructions determining whether the data plan associated with the account associated with the portable computing device specifies a data quota identifying a maximum amount of data for communication by the portable communication device. Responsive to determining the data plan specifies a data quota, the portable computing device determines a data synchronization setting optimizing exchange of data between the portable computing device and a server.

If a first data synchronization setting is determined, the portable computing device maximizes a frequency with which the portable computing device exchanges data with the server and captures data describing an amount of data exchanged between the portable computing device and the server. The captured data is used to calculate an estimated data usage and the portable computing device determines whether the estimated data usage equals or exceeds the data quota. Responsive to determining the estimated data usage equals or exceeds the data quota, the frequency with which the portable computing device exchanges data with the server is modified. In one embodiment, the frequency with which the portable computing device exchanges data with the server is modified based on the captured data, the estimated data usage and the data quota. For example, a difference between the estimated data usage and the data quota is calculated and used to determine a time interval for transmitting requests for data from the portable computing device to the server. However, if a second data synchronization setting is determined, the portable computing device minimizes the frequency with which the portable computing device exchanges data with the server.

In the following description, for purposes of explanation, numerous specific details are set forth to provide a thorough understanding of the invention. However, it will be apparent to one skilled in the art that the invention can be practiced without these specific details. In other instances, structures and devices are shown in block diagram form in order to avoid obscuring the invention.

System Overview

Figure 1:
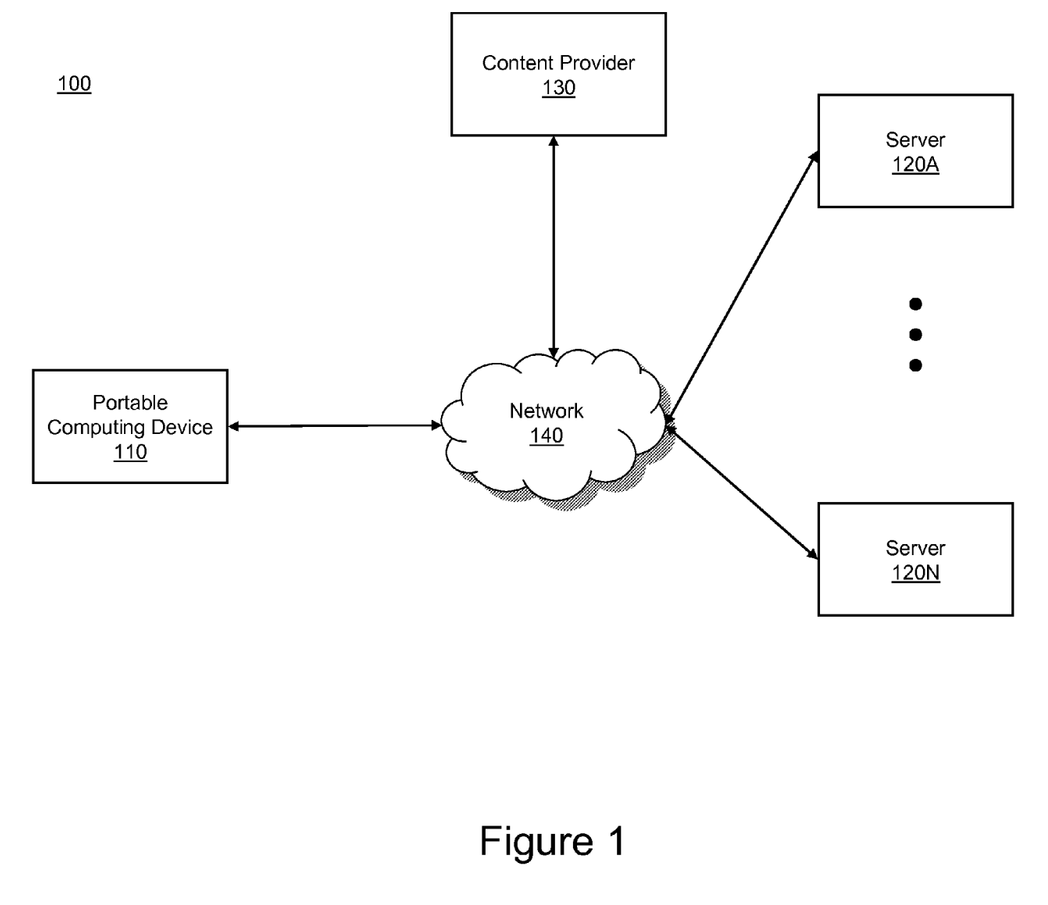
FIG. 1 is a block diagram of a computing system in accordance with some embodiments.

FIG. 1 is a block diagram of one embodiment of a computing system 100. In the embodiment shown by FIG. 1, the computing system 100 includes a portable computing device 110, one or more servers 120A, 120N (also referred to individually and collectively using reference number 120), a content provider 130 and a network 140. However, in different embodiments, the computing system 100 may include different and/or additional components than those depicted by FIG. 1.

The portable computing device 110 is any device with data processing and data communication capabilities. Examples of a portable computing device 110 include a smartphone, a tablet computer, a netbook computer, a laptop computer or any other suitable device. The portable computing device 110 receives data from one or more servers 120A, 120N and/or from a content provider 130 via the network 140. In one embodiment, the portable computing device 110 executes one or more applications exchanging data with one or more servers 120 or a content provider 130. For example, the portable computing device 110 executes an electronic mail (e-mail) client application exchanging data associated with one or more e-mail accounts with one or more servers 120. As another example, the portable computing device 110 executes a social networking application receiving social network data associated with an account from a server 120 and/or transmitting social network data associated with the account to the server 120.

In one embodiment, the portable computing device 110 also receives executable data or instructions from a server 120 via the network 140 that, when executed by the portable computing device 110, executes an application enabling user interaction with content. Additionally, the portable computing device 110 may receive video content, image content or other content from a content provider 130 and present the received content to a user. For example, the portable computing device 110 displays video content from a content provider 130 on a display device. The portable computing device 110 is further described below in conjunction with FIG. 2.

Servers 120A, 120N are computing devices having data processing and data communication capabilities that exchange data with the portable computing device 110 via the network 140. For example, a server 120 provides data such as a web page, audio content, video content, e-mail, calendar information, social networking data or other content via the network 140 to the portable computing device 110 and/or receives data from a portable computing device 110 via the network 140. In one embodiment, a server 120 receives a polling request from the portable computing device 110 via the network 140 at a specified time interval and transmits data to the portable computing device 110 responsive to receiving the polling request or stores data from the portable computing device 110 included in the received polling request. In another embodiment, a server 120 pushes data to the portable computing device 110 using the network 140 at a specified interval.

The content provider 130 comprises one or more computing devices transmitting video content, image content, audio content or other content to the portable computing device 110 via a network 140. For example, the content provider 130 is a video hosting web site, a television provider or another source of video, image or audio content. As another example, the content provider 130 is a streaming video source transmitting streaming video content. In one embodiment, the content provider 130 exchanges data with the portable computing device 110 via the network 140 at predetermined intervals either by pushing content to the portable computing device 110 at periodic intervals or by transmitting data to the portable computing device 110 responsive to receiving a polling request from the portable computing device 110.

The network 140 is a conventional type for data, video and/or audio transmission. In various embodiments, the network 140 is a wired network, a wireless network or a combination of wireless and wired networks. In one embodiment, the network 140 is associated with a provider, which is an entity supplying and/or maintaining at least a subset of the components comprising the network 140. The network 140 may communicate a provider identifier to a portable computing device 110 coupled to the network 140 to identify the provider facilitating data exchange by the portable computing device 110.

The network 140 may have any number of configurations such as a star configuration, a token ring configuration or another configuration known in the art. Furthermore, the network 140 may comprise a local area network (LAN), a wide area network (WAN) (e.g., the Internet), and/or any other interconnected data path across which multiple devices may communicate. In yet another embodiment, the network 140 may be a peer-to-peer network. The network 140 may also be coupled to or include portions of a telecommunications network for sending data in a variety of different communication protocols, such as those used for Transmission Control Protocol/Internet Protocol (TCP/IP), satellite link and/or cable television communication. For example, the network 140 may transmit voice data using one or more of a Global System for Mobile (GSM) communication system, Code Division Multiple Access (CDMA) system, Universal Mobile Telecommunications System (UMTS) or any other suitable protocols.

The network 140 may also transmit data using one or more of General Packet Radio Service (GPRS), second-generation (2G), or higher, mobile network, third-generation (3G), or greater, mobile network, fourth-generation (4G), or greater, mobile network, High Speed Download Packet Access (HSDPA), High Speed Uplink Packet Access (HSUPA), Long-Term Evolution (LTE), Worldwide Interoperability for Microwave Access (WiMax) or any other suitable protocol. In yet another embodiment, the network 140 includes Bluetooth communication networks or a cellular communications network for sending and receiving data such as via short messaging service (SMS), multimedia messaging service (MMS), hypertext transfer protocol (HTTP), direct data connection, wireless application protocol (WAP), email or other types of data known in the art.

Figure 2:
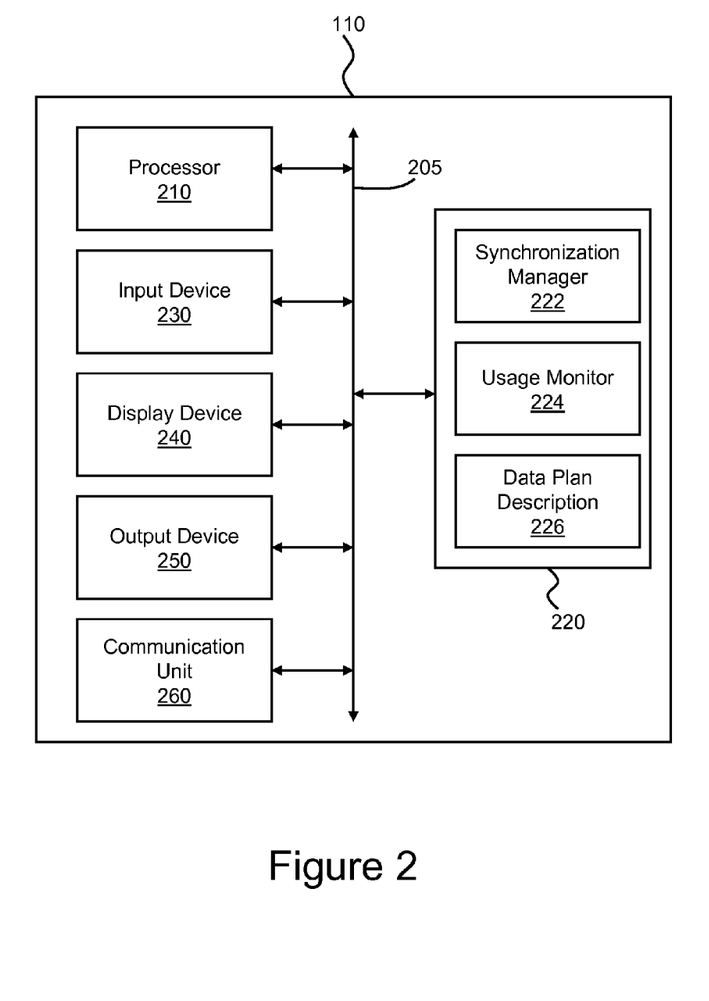
FIG. 2 is a block diagram of a portable computing device in accordance with some embodiments.

FIG. 2 is a block diagram of one embodiment of a portable computing device 110. In the embodiment shown by FIG. 2, the portable computing device 110 includes a processor 210, a storage device 220, an input device 230, a display device 240, an output device 250 and a communication unit 260 that are coupled together via a bus 205. However, in different embodiments, the portable computing device 110 may include different and/or additional components than those illustrated by FIG. 2.

The processor 210 processes data or instructions and may comprise various computing architectures. For example, the processor 210 processes data or instructions using a complex instruction set computer (CISC) architecture, a reduced instruction set computer (RISC) architecture, an architecture implementing a combination of instruction sets or any other suitable instruction set. Although FIG. 2 shows a single processor 210, in other embodiments, the portable computing device 110 may include multiple processors. The processor 210 transmits, processes and/or retrieves data from the storage device 220, the input device 230, the display device 240, the output device 250 and/or the communication unit 260.

The storage device 220 stores data and/or instructions that, when executed by the processor 210, cause the processor 210 to perform one or more actions or to provide one or more types of functionality. The data and/or instructions included in the storage device 220 may comprise computer-readable code that, when executed by the processor 210, performs one or more of the methods described herein and/or provide at least a subset of the functionality described herein. The storage device 220 may comprise a dynamic random access memory (DRAM), a static random access memory (SRAM), a hard disk, an optical storage device, a magnetic storage device, a Read Only Memory (ROM), a Programmable Read Only Memory (PROM), an Erasable Programmable Read Only Memory (EPROM), an Electrically Erasable Programmable Read Only Memory (EEPROM), a Flash memory or another memory device known in the art. The storage device 220 may be a persistent storage device, a non-persistent storage device or a combination of a persistent storage device and a non-persistent storage device in various embodiments. The storage device 220 is coupled to the processor 210, the input device 230, the display device 240, the output device 250 and the communication unit 260 via the bus 205.

In the embodiment shown by FIG. 2, the storage device 220 includes a synchronization manager 222, a usage monitor 224 and a data plan description 226. In other embodiments, the storage device 220 may include different and/or additional components than those shown in FIG. 2. The synchronization manager 222 comprises instructions that, when executed by the processor 210, modify the frequency with which one or more applications executed by the portable computing device 110 exchange data with a server 120 or with a content provider 130. In one embodiment, the synchronization manager 222 stores one or more synchronization settings describing one or more frequencies with which the portable computing device 110 exchanges data with one or more servers 120 and/or content providers 130. For example, the synchronization manager 222 includes a polling interval identifying a time between transmission of requests for data from the portable computing device 110 to a server 120 and/or to a content provider 130. As another example, the synchronization manager 222 includes instructions for establishing a push communication channel between the portable computing device 110 and a server 120 and/or a content provider 130 and may also identify when data is pushed between the server 120 or the content provider 130 using the push communication channel, such as a push interval or a description of events causing data to be pushed. The synchronization manager 222 may include multiple synchronization settings, allowing data exchange between the portable computing device 110 and a server 120 and/or a content provider 130 by using different synchronization settings. In one embodiment, the synchronization manager 222 associates an application identifier with one or more synchronization settings, allowing different applications executed by the portable computing device 110 to use different synchronization settings or to use multiple synchronization settings.

In one embodiment, a synchronization setting is associated with one or more conditions indicating when the synchronization setting is used. For example, a synchronization setting initially used by the portable computing device 110 is associated with a default synchronization setting. As another example, a user preference is associated with one or more synchronization settings, specifying the preference of a portable computing device user for use of different synchronization settings. A synchronization setting may also be associated with a data usage level, allowing different synchronization settings to be used for modifying the amount of data exchanged between the portable computing device 110 and a server 120 or a content provider 130.

The synchronization manager 222 also includes instructions that, when executed by the processor 210 modifies the synchronization setting based on data from the usage monitor 224 and the data plan description 226. This allows the synchronization manager 222 to modify the frequency with which the portable computing device 110 exchanges data with one or more servers 120 and/or one or more content providers 130. In one embodiment, the synchronization manager 222 compares data from the usage monitor 224 describing the amount of data exchanged between the portable computing device 110 and one or more servers 120 and/or content providers 130 over a time interval to a data quota from the data plan description 226. In one embodiment, the synchronization manager 222 calculates an estimated data usage based on data from the usage monitor 224. The estimated data usage identifies the amount of data likely to be exchanged between the portable computing device 110 and one or more servers 120 and/or content providers 130 during a time interval.

Based on the estimated data usage and data from the data plan description 226, the synchronization manager 222 modifies the frequency with which the portable computing device 110 exchanges data with one or more servers 120 and/or content providers 130. For example, responsive to the estimated data usage exceeding a data quota specified by the data plan description 226, the synchronization manager 222 selects a synchronization setting reducing the frequency with which the portable computing device 110 exchanges data with one or more servers 120 and/or content providers 130.

In one embodiment, the synchronization manager 222 also selects an initial synchronization setting for exchanging data between the portable computing device 110 and one or more servers 120 and/or content providers 130 based on the data plan description 226. For example, if the data plan description 226 does not include a data quota, the synchronization manager 222 selects a synchronization setting maximizing the frequency with which the portable computing device 110 exchanges data with one or more servers 120 and/or content providers 130. If the data plan description 226 includes a data quota, the synchronization manager 222 selects a synchronization setting based on stored data, such as user preferences for synchronization settings or data usage information. In one embodiment, the synchronization manager 222 reduces the frequency with which the portable computing device 110 exchanges data with one or more servers 120 and/or content providers 130 if the data plan description includes a data quota.

In one embodiment, the synchronization manager 222 also includes a data roaming setting. The data roaming setting is enabled when the portable computing device 110 communicates with a network 140 associated with a provider differing from a provider associated with an account associated with the portable computing device 110. For example, if a first provider is associated with the account associated with the portable computing device 110, the data roaming setting is disabled when the portable computing device 110 communicates with a network 140 associated with the first provider and is enabled when the portable computing device 110 communicates with a network 140 associated with a different provider. Alternatively, the data roaming setting may be enabled responsive to an input from a user manually enabling the data roaming setting.

The synchronization manager 222 may modify the frequency with which the portable computing device 110 exchanges data with one or more servers 120 and/or content providers 130 using the data roaming setting, the estimated data usage and/or data from the data plan description 226. For example, responsive to the data roaming setting being enabled, the synchronization manager 222 retrieves a cost of a data exchange while the data roaming setting is enabled from the data plan description 226, the synchronization manager 222 selects a synchronization setting reducing the frequency with which the portable computing device 110 exchanges data with one or more servers 120 and/or content providers 130. In one embodiment, the selected synchronization setting minimizes the product of the cost and an estimated data usage or produces a product of the cost and the estimate data usage that is less than or equal to a stored threshold value. Modification of the synchronization setting based on estimated data usage and data plan and/or data roaming setting is further described below in conjunction with FIGS. 3 and 4.

The usage monitor 224 comprises instructions that, when executed by the processor 210, capture data describing the amount of data exchanged between the portable computing device 110 and one or more servers 120 and/or content providers 130. In one embodiment, the usage monitor 224 communicates with the communication unit 260 to determine the amount of data transmitted by the communication unit 260 and/or the amount of data received by the communication unit 260. For example, the usage monitor 224 captures data indicating a number of megabytes of data transmitted by the portable computing device 110 and/or received by the portable computing device 110 over a time interval, such as a day or a week. In one embodiment, the usage monitor 224 also includes data specifying the length of time over which the usage monitor 224 captures data. For example, the usage monitor 224 indicates whether data was captured over a day, over a week or over another time interval.

The data plan description 226 comprises instructions that, when executed by the processor 210, describe a data plan associated with an account associated with the portable computing device 110. The data plan description 226 specifies whether the account is associated with a data quota that specifies an amount of data transmitted or received by the portable computing device 110 during a time interval. For example, the data quota specifies a maximum amount of data the portable computing device 110 may exchange with other devices during a time interval. In one embodiment, a user of the portable computing device 110 incurs additional charges if the portable computing device 110 exchanges an amount of data in a time interval exceeding the data quota. In one embodiment, the data plan description 226 receives data from a server 120 specifying a data quota and/or other data plan information for the account associated with the portable computing device 110.

The data plan description 226 may also include data identifying a provider associated with an account associated with the portable computing device 110. In one embodiment, the provider maintains and/or configures a network 140 and/or other communication resources and provides the portable computing device 110 with access to the network 140 and/or other communication resources. The data plan description 226 may also associate a cost with a data exchange occurring when the data roaming setting is enabled. In one embodiment, the data plan description 226 may specify a financial amount associated with an amount of data exchanged when the data roaming setting is enabled. For example, the data plan description 226 associates a cost of $0.30 for each megabyte of data exchanged when the data roaming setting is enabled.

The input device 230 is any device configured to receive input and to communicate the received input to the processor 210, to the storage device 220 or to another component of the portable computing device 110. For example, the input device 230 comprises a cursor controller, a touch-sensitive display or a keyboard. In one embodiment, the input device 230 includes an alphanumeric input device, such as a keyboard, a key pad, representations of such created on a touch-sensitive display or another device adapted to communicate information and/or commands to the processor 210 or to the storage device 220. In another embodiment, the input device 230 comprises a device for communicating positional data as well as data or commands to the processor 210 or to the storage device 220 such as a joystick, a mouse, a trackball, a stylus, a touch-sensitive display, directional keys or another suitable input device known in the art.

In one embodiment, the input device 230 may also include an orientation sensor determining an orientation associated with the portable computing device 110. For example, the orientation sensor comprises a tilt sensor measuring tilting in two or more axes of a reference plane. In one embodiment, the orientation sensor comprises an accelerometer determining an orientation of the portable computing device 110. The orientation sensor may generate a first control signal responsive to determining the portable computing device 110 has a first orientation and generates a second control signal responsive to determining the portable computing device 110 has a second orientation. For example, the orientation sensor generates the first control signal responsive to determining the portable computing device 110 has a first orientation relative to a reference plane and generates the second control signal responsive to determining the portable computing device 110 has a second orientation relative to the reference plane. For example, the orientation sensor generates the first control signal responsive to being perpendicular to a reference plane and generates the second control signal responsive to being parallel to the reference plane. In one embodiment, the first orientation and the second orientation are orthogonal to each other, such as a landscape orientation and a portrait orientation.

The display device 240 is a device that displays electronic images and/or data. For example, the display device 240 comprises an organic light emitting diode display (OLED), a liquid crystal display (LCD) or any other device such as a monitor. In one embodiment, the display device 240 includes a touch-sensitive transparent panel for receiving data or allowing other interaction with the images and/or data displayed by the display device 240.

The output device 250 comprises one or more devices that convey data or information to a user of the portable computing device 110. For example, the output device 250 includes one or more speakers or headphones for presenting audio data to a user. As another example, the output device 250 includes one or more light emitting diodes (LEDs) or other light sources to provide visual data to a user. As another example, the output device 250 includes one or more devices for providing vibrational, or haptic, feedback to a user. The above are merely examples and the output device 250 may include one or more devices for providing auditory output, tactile output, visual output, any combination of the preceding or any other suitable form of output.

The communication unit 260 transmits data from portable computing device 110 to the network 140 or to other portable computing devices 110 and/or receives data from a server 120 or a content provider 130 via the network 140. In one embodiment, the communication unit 260 comprises a wireless transceiver that transmits and/or receives data using one or more wireless communication protocols. For example, the communication unit 260 includes one or more wireless transceivers transmitting and/or receiving data using one or more wireless communication protocols, such as IEEE 802.11a/b/g/n (WiFi), Global System for Mobile (GSM), Code Division Multiple Access (CDMA), Universal Mobile Telecommunications System (UMTS), General Packet Radio Service (GPRS), second-generation (2G), or greater, mobile network, third-generation (3G), or greater, mobile network, fourth-generation (4G), or greater, mobile network, High Speed Download Packet Access (HSDPA), High Speed Uplink Packet Access (HSUPA), Long-Term Evolution (LTE), Worldwide Interoperability for Microwave Access (WiMax), near field communication (NFC), BLUETOOTH® or another wireless communication protocol. In another embodiment, the communication unit 260 is a network adapter or other type of wired communication port for communicating with the network 140 or with another portable computing device 110 using a wired communication protocol, such as Universal Serial Bus (USB), Ethernet or another suitable wired communication protocol. In yet another embodiment, the communication unit 260 comprises a combination of one or more transceivers and a wired network adapter, or similar wired device.

Methods

Figure 3:
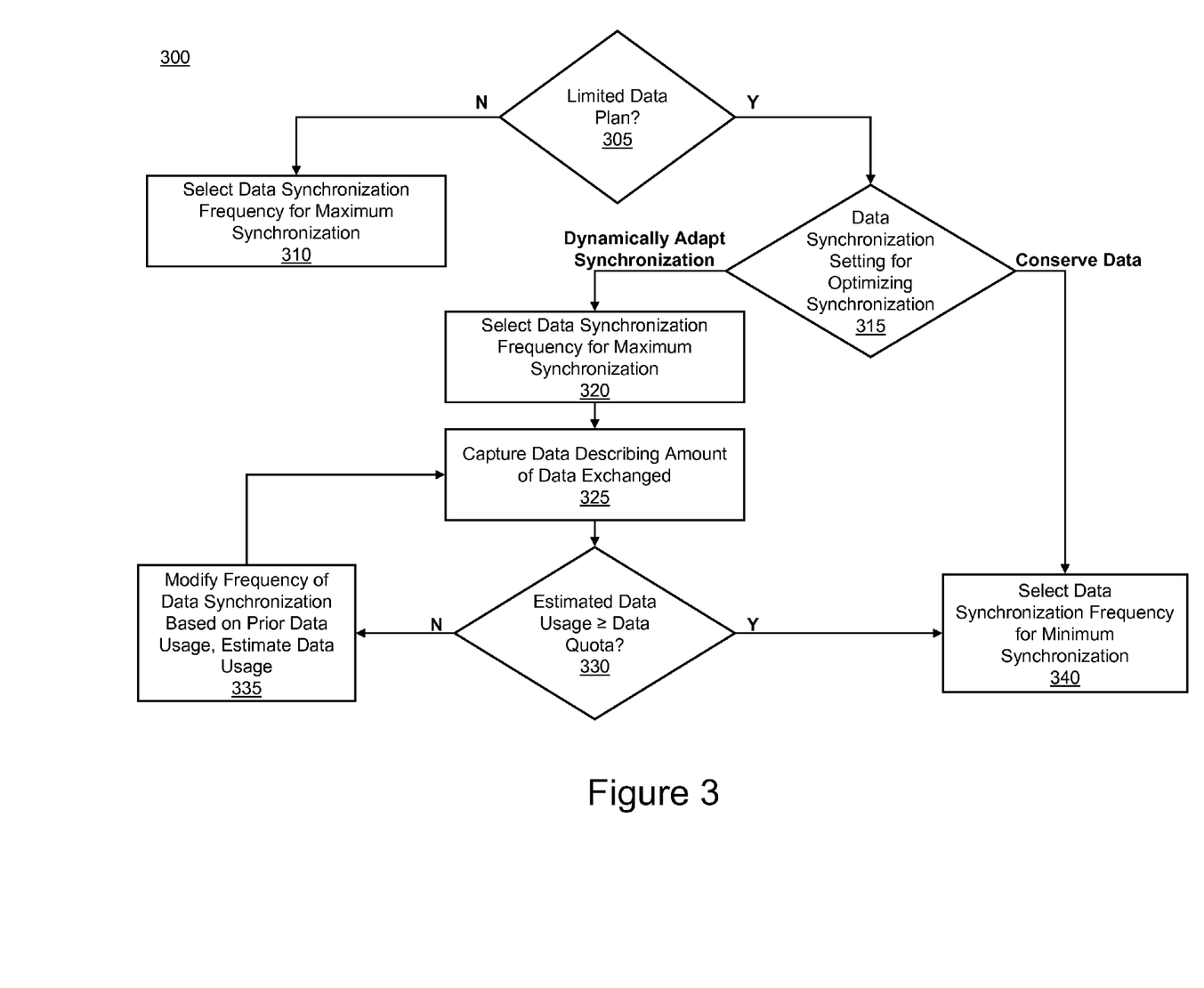
FIG. 3 is a flow chart of a method for modifying data synchronization of a portable computing device responsive to the amount of data exchanged and a data plan associated with an account associated with the portable computing device in accordance with some embodiments.

FIG. 3 is a flow chart of a method 300 for modifying data synchronization of a portable computing device 110 responsive to a data plan associated with an account associated with the portable computing device 110. In one embodiment, the steps illustrated by the method 300 shown by FIG. 3 are implemented by instructions for performing the described actions embodied or stored within a non-transitory computer readable storage medium that, when executed by a processor 210, provide the functionality further described below. Examples of a non-transitory computer readable storage medium, such as the storage device 220, include flash memory, random access memory (RAM) or any other suitable medium known to one skilled in the art.

The method 300 may be implemented in embodiments of hardware, software or combinations of hardware and software. In one embodiment, instructions for performing the actions described below are stored in the storage device 220 of the portable computing device 110, such as in the synchronization manager 222, and execution of the instructions by the processor 210 performs the actions described below. Moreover, in some embodiments, the method 300 includes different and/or additional steps than those shown by FIG. 3.

The synchronization manager 222 included in a portable computing device 110 determines 305 whether a data plan associated with an account associated with the portable computing device 110 is a limited data plan. As used herein, "a limited data plan" is a data plan specifying a data quota identifying a maximum amount of data capable of being communicated by the portable computing device 110. For example, the synchronization manager 222 determines 305 whether the data plan description 226 stored by the portable computing device 110 identifies a maximum amount of data that the portable computing device 110 may transmit and/or receive during a specified time interval. As an example, the synchronization manager 222 determines 305 whether the data plan description 226 specifies a number of megabytes of data that the portable computing device 110 may exchange with one or more servers 120 and/or content providers 130 during a month.

Responsive to determining 305 the data plan description 226 does not describe a limited data plan, the synchronization manager 222 selects 310 a data synchronization frequency maximizing data exchange between the portable computing device 110 and one or more server 120 and/or content providers 130. In one embodiment, the synchronization manager 222 establishes a push communication channel between the portable computing device 110 and a server 120 and/or a content provider 130 to maximize the frequency of data exchange. Alternatively, the synchronization manager 222 specifies a high frequency for transmitting data requests from the portable computing device 110 to the server 120 or to the content provider 130 to maximize the frequency of data exchange.

However, responsive to determining 305 the data plan description 226 specifies a maximum amount of data capable of being communicated by the portable computing device 110 during a time interval, the synchronization manager 222 determines 315 a data synchronization setting optimizing synchronization between the portable computing device 110 and one or more servers 120 and/or content providers 130 based. In one embodiment, the synchronization manager 222 determines 315 the synchronization setting optimizing synchronization based on one or more conditions stored by the synchronization manager 222 indicating when a synchronization setting is used. For example, the synchronization manager 222 stores data describing a preference of a portable computing device user for conserving data usage or for dynamically adapting synchronization based on data usage. As another example, the synchronization manager 222 stores data specifying use of a synchronization setting based on the power available to the portable computing device 110.

Alternatively, the synchronization manager 222 determines 315 the data synchronization setting optimizing data synchronization based on data from the usage monitor 224 and the data plan description 226. For example, if a difference between the amount of data exchanged by the portable computing device 110 and the data quota from the data plan description 226 is less than a threshold value, the synchronization manager 222 determines 315 the portable computing device 110 uses a synchronization setting dynamically adapting synchronization based on the amount of data exchanged. However, if the difference between the amount of data exchanged by the portable computing device 110 equals or exceeds the threshold value, the synchronization manager 222 determines 315 the portable computing device 110 uses a synchronization setting minimizing the frequency of data exchange between the portable computing device 110 and the server 120 and/or the content provider 130.

Responsive to determining 315 the portable computing device 110 uses a synchronization setting minimizing the amount of data exchanged, the synchronization manager 222 initially selects 340 a data synchronizing frequency minimizing data exchange between the portable computing device 110 and a server 120 and/or a content provider 130. For example, the synchronization manager 222 selects 340 a pull configuration for data exchange where the portable computing device 110 transmits requests for data to the server 120 and/or the content provider 130 separated by a long time interval.

Responsive to determining 315 the portable computing device 110 uses a synchronization setting dynamically adapting synchronization based on the amount of data exchanged, the synchronization manager 222 initially selects 320 a data synchronization frequency maximizing exchange of data between the portable computing device 110 and the server 120 and/or the content provider 130. In one embodiment, the synchronization manager 222 establishes a push communication channel between the portable computing device 110 and the server 120 and/or the content provider 130 to maximize data exchange. Alternatively, the synchronization manager 222 specifies a high frequency of transmission of data requests from the portable computing device 110 to the server 120 or to the content provider 130 to maximize data exchange.

After initially selecting 320 the data synchronization frequency maximizing data exchange between the portable computing device 110 and one or more servers 120 and/or content providers 130, the usage monitor 224 captures 325 data describing the amount of data exchanged between the portable computing device 110 and the server 120 and/or the content provider 130. Thus, the usage monitor 224 captures 325 the amount of data transmitted and/or received by the portable computing device 110. In one embodiment, the usage monitor 224 continuously receives information from a communication unit 260 in the portable computing device 110 specifying the amount of data transmitted from the portable computing device 110 and/or the amount of data received by the portable computing device 110. The usage monitor 224 sums the amount of data received and the amount of data transmitted to determine the amount of data exchanged by the portable computing device 110. Alternatively, the usage monitor 224 periodically receives information from the communication unit 260 indicating the amount of data exchanged by the portable computing device 110.

The synchronization manager 222 retrieves the amount of data exchanged by the portable computing device 110 from the usage monitor 224 and calculates an estimated data usage based on the data from the usage monitor 224 to estimate an amount of data likely to be exchanged between the portable computing device 110 and one or more servers 120 and/or content providers 130 over a time interval. In one embodiment, the synchronization manager 222 calculates a data usage rate by dividing the amount of data exchange captured by the usage monitor 224 by the length over time over which the data exchange amount was captured. The synchronization manager 222 also retrieves the data quota and a time interval associated with the data quota from the data plan description 226 and multiplies the calculated data usage rate by a ratio of the time interval associated with the data quota to the length of time over which the data exchange amount was captured by the usage monitor 224 to calculate an estimated data usage.

The synchronization manager 222 then determines 330 whether the estimated data usage equals or exceeds the data quota from the data plan description 226. In one embodiment, responsive to determining 330 the estimated data usage is less than the data quota, the synchronization manager 222 modifies 335 the frequency with which the portable computing device 110 exchanges data with the server 120 and/or the content provider 130 based on the captured data, the estimated data usage and the data quota. For example, the synchronization manager 222 divides a difference between the data quota and the estimated data usage by the difference between the time interval associated with the data quota and the time over which the usage monitor 224 captured the amount of data exchanged. The synchronization manager 222 may use the calculated quotient to determine a modified frequency with which the portable computing device 110 exchanges data with the server 120 and/or the content provider 130. In one embodiment, the synchronization manager 222 modifies 335 the time interval between transmission of requests for data from the portable computing device 110 and the server 120 and/or content provider 130 based on the calculated quotient to reduce the frequency of transmission of requests for data. In another embodiment, the synchronization manager 222 modifies 335 the time interval between transmission of requests for data based on a difference between the estimated data usage and the data quota to less frequently transmit requests for data from the portable computing device 110.

For example, if the usage monitor 224 captures data indicating the portable computing device 110 has exchanged 6 megabytes of data over two weeks and the data plan description 226 includes a data quota of 10 megabytes per four week interval, the synchronization manager 222 calculates (10 megabytes−6 megabytes)/(4 weeks−2 weeks). The synchronization manager 222 then uses the resulting value of 2 megabytes/week to determine a modified frequency for the portable computing device 110 to exchange data with the server 120 and/or the content provider 130. For example, the synchronization manager 222 reduces the frequency of data exchange between the portable computing device 110 and the server 120 or the content provider 130 so that 1 megabyte of data is exchanged each week for a two week interval.

After modifying 335 the frequency with which the portable computing device 110 exchanges data with the server 120 and/or content provider 130, the usage monitor 224 captures 325 data describing data exchange using the modified frequency, as described above. The synchronization manager 222 calculates an estimated data usage from the captured data exchange description and determines 330 whether the estimated data usage equals or exceeds the data quota, as described above. This allows the synchronization manager 222 to dynamically modify 335 the frequency with which data is exchanged between the portable computing device 110 and the server 120 and/or the content provider 130 as the amount of data exchanged by the portable computing device 110 fluctuates.

However, responsive to determining 330 the estimated data usage equals or exceeds the data quota, the synchronization manager 222 selects 340 a minimal synchronization frequency between the portable computing device 110 and a server 120 and/or a content provider 130 to minimize the amount of data exchanged. For example, the synchronization manager 222 selects 340 a pull configuration with a long time interval between data requests transmitted by the portable computing device 110 to minimize data exchange. Selecting 340 a minimal frequency for data exchange when the estimated data usage equals or exceeds the data quota minimizes amount of data exchanged by the portable computing device 110 and the server 120 and/or the content provider 130. This minimization reduces the costs incurred by a portable computing device user by preventing the user from incurring additional fees for exceeding the data quota or by reducing the additional fees incurred by the user by reducing the amount of data exchanged in excess of the data quota. In one embodiment, the synchronization manager 222 may also display a warning message to a user via the display device 240 responsive to determining 330 the estimated data usage equals or exceeds the data quota, allowing a user to manually stop data exchange between the portable computing device 110 and the server 120 and/or content provider 130 or to obtain a data plan having a larger data quota.

Figure 4:
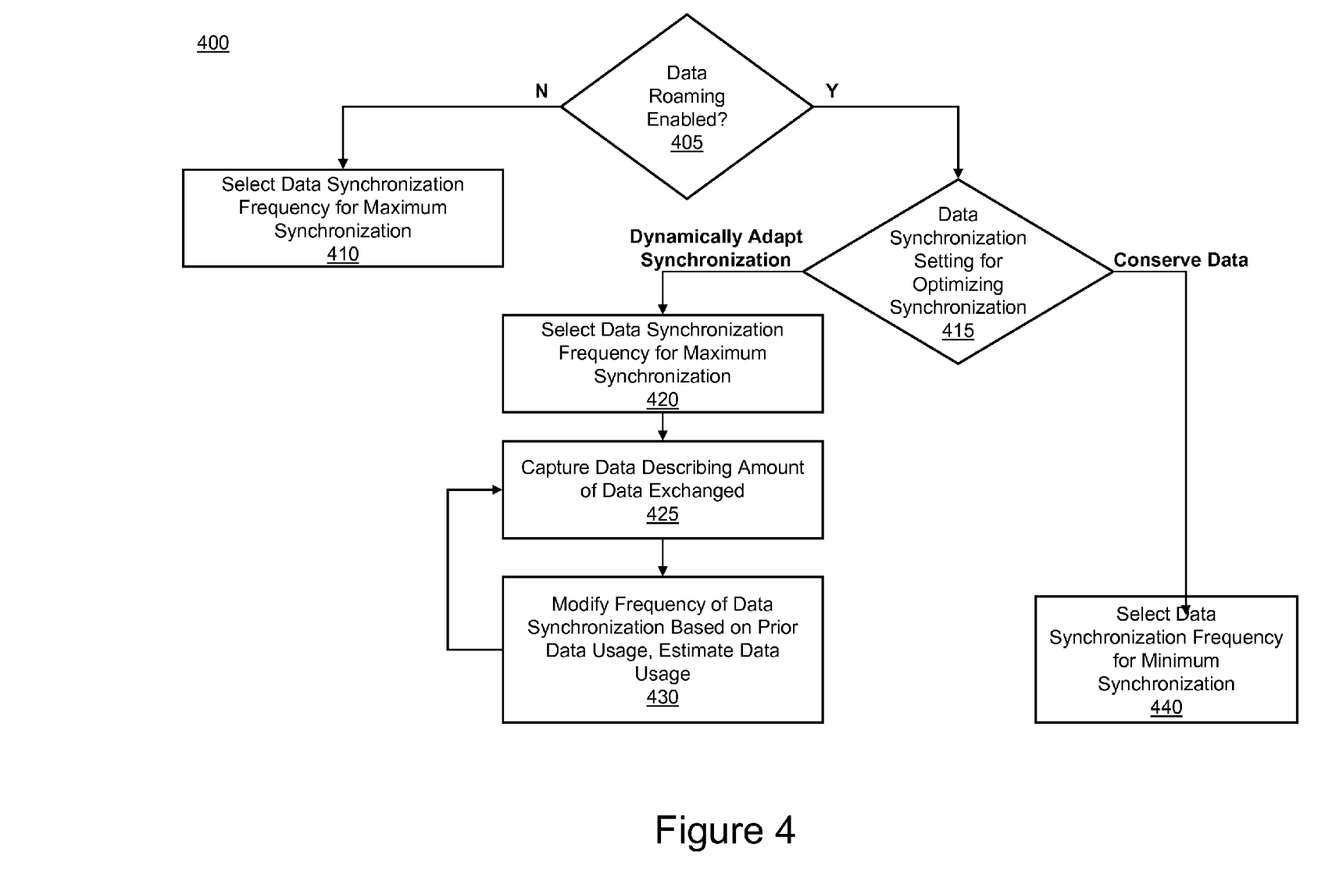
FIG. 4 is a flow chart of a method for modifying data synchronization of a portable computing device responsive to the amount of data exchanged and a data roaming setting associated with the portable computing device in accordance with some embodiments.

FIG. 4 is a flow chart of one embodiment of a method 400 for modifying data synchronization of a portable computing device 110 responsive to the amount of data exchanged and a data roaming setting associated with the portable computing device 110. In one embodiment, the steps illustrated by the method 400 shown by FIG. 4 are implemented by instructions for performing the described actions embodied or stored within a non-transitory computer readable storage medium that, when executed by a processor 210, provide the functionality further described below. Examples of a non-transitory computer readable storage medium, such as the storage device 220, include flash memory, random access memory (RAM) or any other suitable medium known to one skilled in the art.

The method 400 may be implemented in embodiments of hardware, software or combinations of hardware and software. In one embodiment, instructions for performing the actions described below are stored in the storage device 220 of the portable computing device 110, such as in the synchronization manager 222, and execution of the instructions by the processor 210 performs the actions described below. Moreover, in some embodiments, the method 400 includes different and/or additional steps than those shown by FIG. 4.

The synchronization manager 222 included in a portable computing device 110 determines 405 whether a data roaming setting is enabled. In one embodiment, the data roaming setting is enabled when the portable computing device 110 communicates with a network 140 associated with a provider differing from a provider associated with an account associated with the portable computing device 110. For example, if a first provider is associated with the account associated with the portable computing device 110, the data roaming setting is disabled when the portable computing device 110 communicates with a network 140 associated with the first provider and is enabled when the portable computing device 110 communicates with a network 140 associated with a different provider. Alternatively, the data roaming setting may be enabled responsive to an input from a user manually enabling the data roaming setting.

In one embodiment, the data plan description 226 includes data identifying the provider associated with the account associated with the portable computing device 110. The synchronization manager 222 compares a provider identifier received from a network 140 via the communication unit 260 to determine 405 whether data roaming is enabled. If the provider identifier received from the network 140 matches the provider identified by the data plan description 226, the synchronization manager 222 determines 405 that data roaming is not enabled. If the provider identifier received from the network 140 does not match the provider identified by the data plan description 226, the synchronization manager 222 determines 405 that data roaming is enabled.

Responsive to determining 405 data roaming is not enabled, the synchronization manager 222 selects 410 a data synchronization frequency maximizing data exchange between the portable computing device 110 and one or more server 120 and/or content providers 130. In one embodiment, the synchronization manager 222 establishes a push communication channel between the portable computing device 110 and a server 120 and/or a content provider 130 to maximize the frequency of data exchange. Alternatively, the synchronization manager 222 specifies a high frequency for transmitting data requests from the portable computing device 110 to the server 120 or to the content provider 130 to maximize the frequency of data exchange.

However, responsive to determining 405 that data roaming is enabled, the synchronization manager 222 determines 415 a data synchronization setting optimizing synchronization between the portable computing device 110 and one or more servers 120 and/or content providers 130 based. In one embodiment, the synchronization manager 222 determines 415 the synchronization setting optimizing synchronization based on one or more conditions stored by the synchronization manager 222 indicating use of a synchronization setting. For example, the synchronization manager 222 stores data describing a preference of a portable computing device user for conserving data usage or for dynamically adapting synchronization based on data usage. As another example, the synchronization manager 222 stores data specifying use of a synchronization setting based on the power available to the portable computing device 110.

Responsive to determining 415 the portable computing device 110 uses a synchronization setting minimizing the amount of data exchanged, the synchronization manager 222 initially selects 440 a data synchronizing frequency minimizing data exchange between the portable computing device 110 and a server 120 and/or a content provider 130. For example, the synchronization manager 222 selects 440 a pull configuration for data exchange where the portable computing device 110 transmits requests for data to the server 120 and/or the content provider 130 separated by a long time interval.

Responsive to determining 415 the portable computing device 110 uses a synchronization setting dynamically adapting synchronization based on the amount of data exchanged, the synchronization manager 222 initially selects 420 a data synchronization frequency maximizing exchange of data between the portable computing device 110 and the server 120 and/or the content provider 130. In one embodiment, the synchronization manager 222 establishes a push communication channel between the portable computing device 110 and the server 120 and/or the content provider 130 to maximize data exchange. Alternatively, the synchronization manager 222 specifies a high frequency of transmission of data requests from the portable computing device 110 to the server 120 or to the content provider 130 to maximize data exchange.

After initially selecting 420 the data synchronization frequency maximizing data exchange between the portable computing device 110 and one or more servers 120 and/or content providers 130, the usage monitor 224 captures 425 data describing the amount of data exchanged between the portable computing device 110 and the server 120 and/or the content provider 130. Thus, the usage monitor 224 captures 425 the amount of data transmitted and/or received by the portable computing device 110. In one embodiment, the usage monitor 224 continuously receives information from the communication unit 260 in the portable computing device 110 specifying the amount of data transmitted from the portable computing device 110 and/or the amount of data received by the portable computing device 110. The usage monitor 224 sums the amount of data received and the amount of data transmitted to determine the amount of data exchanged by the portable computing device 110. Alternatively, the usage monitor 224 periodically receives information from the communication unit 260 indicating the amount of data exchanged by the portable computing device 110.

The synchronization manager 222 retrieves the amount of data exchanged by the portable computing device 110 from the usage monitor 224 and calculates an estimated data usage based on the data from the usage monitor 224. The estimated data usage estimates an amount of data likely to be exchanged between the portable computing device 110 and one or more servers 120 and/or content providers 130 over a time interval. In one embodiment, the synchronization manager 222 calculates a data usage rate by dividing the amount of data exchange captured by the usage monitor 224 by the length over time over which the data exchange amount was captured.

In one embodiment, the synchronization manager 222 or data plan description 226 associates a cost with data exchanges performed while data roaming is enabled. For example, the data plan description 226 associates a monetary amount with an amount of data exchanged while data roaming is enabled, as a portable computing device user may commonly incur additional charges when using a network associated with providers differing from the user's account provider. In one embodiment, the synchronization manager calculates a product of the estimated data usage and a cost associated with a data exchange performed while data roaming is enabled.

The synchronization manager 222 modifies 430 the frequency with which the portable computing device 110 exchanges data with the server 120 and/or the content provider 130 based on the captured data, the estimated data usage and/or a cost associated with a data exchange performed while data roaming is enabled. In one embodiment, the synchronization manager 222 minimizes, over a time interval, the product of estimated data usage and the cost associated with a data exchange performed while data roaming is enabled. For example, the synchronization manager 222 reduces the frequency of transmitting requests for data from the portable computing device 110 and the server 120 and/or content provider 130. In an alternative embodiment, the synchronization manager 222 modifies the frequency of transmission of data requests from the portable computing device 110 so the product of estimated data usage and the cost associated with a data exchange performed while data roaming is enabled is less than or equal to a threshold value.

After modifying 430 the frequency with which the portable computing device 110 exchanges data with the server 120 and/or content provider 130, the usage monitor 224 captures 425 data describing data exchange using the modified frequency, as described above. The synchronization manager 222 then modifies 430 the frequency with which the portable computing device 110 exchanges data with the server 120 and/or the content provider 130 based on the additional captured data, as described above. This allows the synchronization manager 222 to dynamically modify 430 the frequency with which data is exchanged between the portable computing device 110 and the server 120 and/or the content provider 130 as the amount of data exchanged by the portable computing device 110 fluctuates. This allows the synchronization manager 222 reduce costs from exchanging data while the portable computing device 110 has data roaming enabled incurred by the portable computing device user.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "ha . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. In some embodiments, a combination of the two approaches may be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions, programs and/or integrated circuits with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   determining whether a data plan associated with an account associated with a portable computing device specifies a data quota identifying a maximum amount of data for communication by the portable computing device during a data quota time interval;
   responsive to determining the data plan associated with the account specifies the data quota, determining a first data synchronization setting optimizing exchange of data between the portable computing device and a server;
   responsive to determining the first data synchronization setting optimizing exchange of data between the portable computing device and the server and determining that a difference between the data quota and an amount of data exchanged by the portable computing device is less than a threshold value, maximizing a frequency with which the portable computing device exchanges data with the server and capturing data describing the amount of data exchanged by the portable computing device over a captured data time interval;
   calculating an estimated data usage for the data quota time interval based on the captured data;
   determining whether the estimated data usage equals or exceeds the data quota; and
   responsive to determining the estimated data usage equals or exceeds the data quota, dynamically modifying the frequency with which the portable computing device exchanges data with the server.

2. The method of claim 1, further comprising:
   responsive to determining the data plan associated with the account does not specify the data quota, maximizing the frequency with which the portable computing device exchanges data with the server.

3. The method of claim 1, further comprising:
   responsive to determining a second data synchronization setting optimizing exchange of data between the portable computing device and the server, minimizing the frequency with which the portable computing device exchanges data with the server.

4. The method of claim 1, wherein maximizing the frequency with which the portable computing device exchanges data with the server comprises:
   establishing a push data connection between the portable computing device and the server.

5. The method of claim 4, wherein modifying the frequency with which the portable computing device exchanges data with the server comprises:
   closing the push data connection between the portable computing device and the server; and
   transmitting requests for data from the portable computing device to the server at a predetermined interval.

6. The method of claim 1, wherein maximizing the frequency with which the portable computing device exchanges data with the server comprises:
   transmitting requests for data from the portable computing device to the server at a predetermined interval.

7. The method of claim 6, wherein modifying the frequency with which the portable computing device exchanges data with the server comprises:
   determining an extended time interval having a longer duration than the predetermined interval; and
   transmitting requests for data from the portable computing device to the server at the extended time interval.

8. The method of claim 1, further comprising:
   responsive to determining the estimated data usage does not equal or exceeds the data quota, modifying the frequency with which the portable computing device exchanges data with the server by an amount based on the captured data, the estimated data usage and the data quota.

9. The method of claim 8, wherein modifying the frequency with which the portable computing device exchanges data with the server comprises:
   calculating a time interval from a difference between the estimated data usage and the data quota; and
   transmitting requests for data from the portable computing device to the server at the time interval.

10. An apparatus comprising:
    a processor;
    a non-transitory computer readable storage device coupled to the processor, the non-transitory computer readable storage device including instructions that, when executed by the processor, cause the processor to:
       determine whether a data plan associated with an account associated with a portable computing device specifies a data quota identifying a maximum amount of data for communication by the portable computing device during a data quota time interval;
       responsive to determining the data plan associated with the account specifies a data quota, determine a first data synchronization setting optimizing exchange of data between the portable computing device and a server;
       responsive to determining the first data synchronization setting optimizing exchange of data between the portable computing device and the server and determining that a difference between the data quota and an amount of data exchanged by the portable computing device is less than a threshold value, maximize a frequency with which the portable computing device exchanges data with the server and capture data describing the amount of data communicated by the portable computing device over a captured data time interval;
       calculate an estimated data usage for the data quota time interval based on the captured data;
       determine whether the estimated data usage equals or exceeds the data quota; and
       responsive to determining the estimated data usage equals or exceeds the data quota, dynamically modify the frequency with which the portable computing device exchanges data with the server.

11. The apparatus of claim 10, wherein the non-transitory computer readable storage device further includes instructions that, when executed by the processor, cause the processor to:
    responsive to determining the data plan associated with the account does not specify the data quota, maximize the frequency with which the portable computing device exchanges data with the server.

12. The apparatus of claim 10, wherein the non-transitory computer readable storage device further includes instructions that, when executed by the processor, cause the processor to:
    responsive to determining a second data synchronization setting optimizing exchange of data between the portable computing device and the server, minimize the frequency with which the portable computing device exchanges data with the server.

13. The apparatus of claim 10, wherein the non-transitory computer readable storage device further includes instructions that, when executed by the processor, cause the processor to:
 establish a push data connection between the portable computing device and the server.

14. The apparatus of claim 13, wherein modify the frequency with which the portable computing device exchanges data with the server comprises:
 closing the push data connection between the portable computing device and the server; and
 transmitting requests for data from the portable computing device to the server at a predetermined interval.

15. The apparatus of claim 10, wherein maximize the frequency with which the portable computing device exchanges data with the server comprises:
 transmitting requests for data from the portable computing device to the server at a predetermined interval.

16. The apparatus of claim 15, wherein modify the frequency with which the portable computing device exchanges data with the server comprises:
 determining an extended time interval having a longer duration than the predetermined interval; and
 transmitting requests for data from the portable computing device to the server at the extended time interval.

17. The apparatus of claim 10, wherein the non-transitory computer readable storage device further includes instructions that, when executed by the processor, cause the processor to:
 responsive to determining the estimated data usage does not equal or exceed the data quota, modify the frequency with which the portable computing device exchanges data with the server by an amount based on the captured data, the estimated data usage and the data quota.

18. The apparatus of claim 17, wherein modify the frequency with which the portable computing device exchanges data with the server based on the captured data, the estimated data usage and the data quota comprises:
 calculating a time interval from a difference between the estimated data usage and the data quota; and
 transmitting requests for data from the portable computing device to the server at the time interval.

19. A method comprising:
 determining whether a data plan associated with an account associated with a portable computing device specifies a data quota identifying a maximum amount of data for communication by the portable computing device during a data quota time interval;
 responsive to determining the data plan associated with the account does not specify the data quota, maximizing a frequency with which the portable computing device exchanges data with a server;
 responsive to determining the data plan associated with the account specifies the data quota, determining a first data synchronization setting optimizing exchange of data between the portable computing device and the server;
 responsive to determining the first data synchronization setting optimizing exchange of data between the portable computing device and the server and determining that a difference between the data quota and an amount of data exchanged by the portable computing device is less than a threshold value, maximizing the frequency with which the portable computing device exchanges data with the server and capturing data describing the amount of data exchanged between the portable computing device and the server over a captured data time interval; and
 responsive to determining a second data synchronization setting optimizing exchange of data between the portable computing device and the server, minimizing the frequency with which the portable computing device exchanges data with the server.

20. The method of claim 19, further comprising:
 calculating an estimated data usage for the data quota time interval based on the captured data;
 determining whether the estimated data usage equals or exceeds the data quota; and
 responsive to determining the estimated data usage equals or exceeds the data quota, displaying a warning message to a user via a display device.

21. A method comprising:
 determining whether a data roaming setting is enabled, the data roaming setting indicating a connection to a network associated with a provider different from a first provider associated with an account associated with a portable computing device, wherein the account is associated with a data quota for a data quota interval;
 responsive to determining the data roaming setting is enabled, determining a first data synchronization setting optimizing exchange of data between the portable computing device and a server;
 responsive to determining the first data synchronization setting optimizing exchange of data between the portable computing device and the server and determining that a difference between the data quota and an amount of data exchanged by the portable computing device is less than a threshold value, maximizing a frequency with which the portable computing device exchanges data with the server and capturing data describing the amount of data exchanged between the portable computing device and the server over a captured data time interval;
 calculating an estimated data usage for the data quota time interval based on the captured data; and
 dynamically modifying the frequency with which the portable computing device exchanges data with the server based on the estimated data usage.

22. The method of claim 21, further comprising:
 responsive to determining a second data synchronization setting optimizing exchange of data between the portable computing device and the server, minimizing the frequency with which the portable computing device exchanges data with the server.

23. The method of claim 21, wherein modifying the frequency with which the portable computing device exchanges data with the server based on the estimated data usage comprises
 determining a cost associated with a data exchange occurring while the data roaming setting is enabled;
 calculating a product of the cost and the estimated data usage; and
 modifying the frequency with which the portable computing device exchanges data with the server to minimize the product during a time interval.

24. The method of claim 21, wherein modifying the frequency with which the portable computing device exchanges data with the server based on the estimated data usage comprises
 determining a cost associated with a data exchange occurring while the data roaming setting is enabled;
 calculating a product of the cost and the estimated data usage; and
 modifying the frequency with which the portable computing device exchanges data with the server so that the product is less than or equal to a threshold value.

25. An apparatus comprising:
a processor;
a non-transitory computer readable storage device coupled to the processor, the non-transitory computer readable storage device including instructions that, when executed by the processor, cause the processor to:
- determine whether a data plan associated with an account associated with a portable computing device specifies a data quota identifying a maximum amount of data for communication by the portable computing device during a data quota time interval;
- responsive to determining the data plan associated with the account does not specify the data quota, maximize a frequency with which the portable computing device exchanges data with a server;
- responsive to determining the data plan associated with the account specifies the data quota, determine a first data synchronization setting optimizing exchange of data between the portable computing device and the server;
- responsive to determining the first data synchronization setting optimizing exchange of data between the portable computing device and the server and determining that a difference between the data quota and an amount of data exchanged by the portable computing device is less than a threshold value, maximize the frequency with which the portable computing device exchanges data with the server and capture data describing the amount of data exchanged between the portable computing device and the server over a captured data time interval; and
- responsive to determining a second data synchronization setting optimizing exchange of data between the portable computing device and the server, minimize the frequency with which the portable computing device exchanges data with the server.

26. An apparatus comprising:
a processor;
a non-transitory computer readable storage device coupled to the processor, the non-transitory computer readable storage device including instructions that, when executed by the processor, cause the processor to:
- determine whether a data roaming setting is enabled, the data roaming setting indicating a connection to a network associated with a provider different from a first provider associated with an account associated with a portable computing device, wherein the account is associated with a data quota for a data quota interval;
- responsive to determining the data roaming setting is enabled, determine a first data synchronization setting optimizing exchange of data between the portable computing device and a server;
- responsive to determining the first data synchronization setting optimizing exchange of data between the portable computing device and the server and determining that a difference between the data quota and an amount of data exchanged by the portable computing device is less than a threshold value, maximize a frequency with which the portable computing device exchanges data with the server and capture data describing the amount of data exchanged between the portable computing device and the server over a captured data time interval;
- calculate an estimated data usage for the data quota time interval based on the captured data; and
- dynamically modify the frequency with which the portable computing device exchanges data with the server based on the estimated data usage.

* * * * *